United States Patent [19]

Galli et al.

[11] 3,953,414

[45] Apr. 27, 1976

[54] CATALYSTS FOR THE POLYMERIZATION OF OLEFINS TO SPHERICALLY SHAPED POLYMERS

[75] Inventors: Paolo Galli, Ferrara; Giovanni Di Drusco, Milan; Saverio De Bartolo, Ferrara, all of Italy

[73] Assignee: Montecatini Edison S.p.A.,, Milan, Italy

[22] Filed: Nov. 15, 1974

[21] Appl. No.: 524,258

Related U.S. Application Data

[63] Continuation of Ser. No. 396,538, Sept. 12, 1974, abandoned.

[30] Foreign Application Priority Data

Sept. 13, 1972 Italy .................................. 29126/72

[52] U.S. Cl. ........................... 526/348; 252/429 R; 252/429 C; 526/4; 526/123; 526/135; 526/145; 526/147; 526/237; 526/352
[51] Int. Cl.$^2$ ................ C08F 210/00; C08F 212/00
[58] Field of Search ...................... 260/94.9 E, 88.2

[56] References Cited
UNITED STATES PATENTS

3,166,542  1/1965  Orzechowski et al. ............ 260/93.7
3,594,330  7/1971  Delbouille .......................... 252/429
3,642,746  2/1972  Kashiwa et al ..................... 260/88.2

FOREIGN PATENTS OR APPLICATIONS

1,140,649  1/1969  United Kingdom

*Primary Examiner*—Joseph L. Schofer
*Assistant Examiner*—A. L. Clingman

[57] ABSTRACT

There are disclosed highly active supported catalysts for the polymerization of olefins to polymers in the form of spheroidal particles which neither break nor cake when subjected to compression. The supported catalysts are prepared by mixing a. a catalyst-forming component which is an organometallic compound of a metal belonging to Group II or III of the Mendelyeev Periodic Table with b. a supported catalyst-forming component which is the product consisting of a carrier comprising an anhydrous Mg halide and of a halogenated Ti compound chemically combined with the carrier or dispersed on the same, said product being in the form of spherical or spheroidal particles of a size comprised between 1 and 350 microns and having characteristics as set forth in detail hereinbelow.

13 Claims, No Drawings

CATALYSTS FOR THE POLYMERIZATION OF OLEFINS TO SPHERICALLY SHAPED POLYMERS

This is a continuation of application Ser. No. 396,538, filed Sept. 12, 1974, now abandoned.

THE PRIOR ART

Supported catalysts of the Ziegler-Natta type are known that are capable of polymerizing the olefins to polymers in the form of particles which reproduce or repeat the shape of the particles of the catalysts. Examples of supported catalysts that yield particulate polymers which have the spherical or spheriodal shape of the catalyst are described in U.S. Pat. No. 3,594,330 and in German Patent Appl. No. 1,957,705.

The polymer granules obtained with the aid of supported catalysts known heretofore to yield particles having the shape of the catalyst particles are fragile or cake easily when subjected to compression.

As is known, the granulation phase of the conventional process for the production of crystalline polymers of the olefins is a burdensome operation that considerably affects the economy of the polymerization process. Quite a large number of attempts have been made to eliminate the granulation step.

The only processes known up to now by which it has been possible to obtain useable polymers directly without requiring granulation in the transformation of the polymers to manufactured articles utilize non-supported Ziegler-Natta catalysts in which $TiCl_3$, used as one catalyst-forming component, is prepared by a special technique from $TiCl_4$ by reduction thereof with organic compounds of aluminum.

The polymers obtained with the aid of such catalysts are in the form of a powder having a narrow range of granule size. The particles of the polymer powder do not have any regular geometrical shape and disintegrate when subjected to abrasion tests. Moreover, those non-granulated polymer powders find application only in processes for the production of fibers.

THE PRESENT INVENTION

An object of this invention is to provide catalysts for the polymerization of olefins which, while prepared from a supported catalyst-forming component and highly active, yield olefin polymers in the form of the particles which have the shape of the supported component which is spherical or spheroidal. Another object is to provide catalysts which yield crystalline olefin polymers in the form of spherical or spheroidal particles which are resistant to crumbling and compacting. Still another object is to provide an improved process for polymerizing olefins to the polymeric polymers having the spherical or spheroidal shape of the supported component of the catalyst used in the process.

These and other objects as will appear hereinafter are accomplished by the present invention in accordance with which the olefins are polymerized in contact with catalysts prepared by mixing a. catalyst-forming components which are organometallic compounds of metal belonging to Groups II or III of the Mendelyeev Periodic Table with b. supported components which are products consisting of a carrier comprising an anhydrous Mg halide and of halogenated Ti compounds chemically combined with, or dispersed on, the carrier, which products are in the form of spherical or spheroidal particles of a size comprised between 1 and 350 microns, characterized by particular values of mechanical resistance to supersonic vibration expressed in Watt. hr/1; by particular values of the mean radius of the pores; and by particular values of the surface area, which satisfy one of the following relationship:

1. the mechanical resistance is comprised between 5 and 40 Watt. hr/1; the mean radius of the pores is comprised in the range from 30 to 70 A; and the surface area is greater than $3 m^2/g$ but smaller than $70 m^2/g$, or
2. the mechanical resistance is comprised between 71 and 20 Watt. hr/1; the mean radius of the pores is comprised between 70 and 150 A; and the surface area is greater than $70 m^2/g$.

By mean radius of the pores is meant the ratio $2V/S$. $10^4$ wherein V represents the total porosity of the particles expressed in cc/g and S is the surface area expressed in square meter/gram.

By mechanical resistance to supersonic vibrations is meant the minimum specific energy (Watt. hr/1) which must be supplied to the particles of the supported catalyst-forming component suspended in an inert liquid in order to cause their almost complete disintegration. By "almost complete disintegration" is meant that more than 80% of the particles show an average size below their starting size.

In the case of the supported catalyst-forming component of the catalysts according to the present invention, the measurement has been carried out by placing a 2 to 3% by weight suspension of the particles in anhydrous heptane in a glass test tube dipped into a water bath and exposing the suspension to the action of the supersonic vibrations; we have used an apparatus developing a specific power comprised between 10 and 80 Watt./1, and supersonic sound waves having a frequency comprised between 22.4 and 45 $KH_z$.

The specific power of the apparatus is expressed by the ratio: power of the transducer to volume of liquid (through which the supersonic energy spreads) contained in a metal tank to which the transducer itself is applied.

Each test piece is subjected to successive treatments of increasing intensity (duration and power) until the particles are almost completely disintegrated in the sense explained above. After the treatment, and separation of most of the heptane, the samples are photographed under an optical microscope.

It has been possible to determine the lowest energy that will cause the almost complete disintegration of the particles by simply comparing the various photographs, due to the fact that, after the treatment, the test pieces or samples showed uniformity of granulometric distribution.

Particularly good results with regard to the mechanical resistance of the spherical or spheroidal polymer particles have been achieved with catalysts the supported component (b) of which is characterized by supersonic resistance values comprised between 10 and 30 Watt.hr/1 and by an average pore radius comprised between 35 and 60 A.

Similarly good results have been obtained using catalysts the supported component (b) of which was characterized by a surface area greater than $70 m^2/g$, a resistance to supersonic vibrations comprised between 1 and 10 Watt. hr/1, and a mean radius of the pores comprised between 70 and 100 A.

Due to the peculiar and particular mechanical characteristics of the polymer particles formed by the catalysts of this invention, it is possible to avoid the granulation step normally used in the conventional processes for converting crystalline polymers of the olefins into manufactured articles.

Moreover, because of the exceptionally high activity of the present catalysts, it is possible, in many instances, to omit the conventional purifying after treatment of the crystalline polymer obtained for removing catalyst residues from it.

The capability of the catalysts of this invention to yield crystalline olefin polymers in the form of spherical or spheroidal particles which neither disintegrate nor compact is the more unexpected considering that the known catalysts which differ from our catalysts in that the supported components thereof have different values of mechanical resistance to the supersonic vibrations, of the mean radius of the pores, and of the surface area either do not result in polymer particles having the shape of the catalyst particles or, if they do, the polymer particles formed thereby are fragile or easily compact.

Component (b) of the present catalysts can be prepared in different ways.

The preferred method for preparing a supported catalyst component having the characteristics indicated in (b) (1) hereinabove consists in spraying, a hydrated Mg dihalide in the molten state or dissolved in water, and more particularly molten $MgCl_2 \cdot 6H_2O$, by known techniques and using equipment designed to yield spherically shaped particles having, in this case, sizes comprised in general between 1 and 300 micron, preferably 30 to 180 micron, subsequently subjecting said particles to a controlled partial dehydration to bring the water of crystallization content thereof to a value below 4 moles of $H_2O$ per mole of the Mg dihalide while avoiding hydrolysis of the Mg dihalide, thereafter reacting the partially dehydrated Mg dihalide particles in a liquid medium comprising a halogenated Ti compound, more particularly $TiCl_4$, heated to a temperature generally higher than 100°C, and finally removing the unreacted Ti compound from the Mg dihalide particles.

In the case of $MgCl_2 \cdot 6H_2O$, the molten chloride is sprayed into a current of hot air, or of hot nitrogen, through nozzles the orifices of which have a diameter such that the spherically shaped particles which are formed have a granulometry comprised between 10 and 300 micron.

The particles thus obtained, from which the finer and coarser particles may be separated by sieving, if desirable, are dehydrated under conditions such that the hydrated Mg chloride is not hydrolized, and until the quantity of hydration water is reduced to values comprised between 0.5 and 3.5 moles, preferably 1.0 and 3.0 moles, per mole of $MgCl_2$.

The partially dehydrated particles are introduced into $TiCl_4$ heated to the boiling point, freed of the excess $TiCl_4$, washed in fresh $TiCl_4$ under heating, and then washed with heptane to remove any trace of $TiCl_4$ which is not fixed on the carrier.

Another method for preparing the supported catalyst-forming component having the characteristics indicated in (b) (1) above consists in spraying solutions of an anhydrous Mg dihalide in an organic solvent such as, for instance, an alcohol, an ether, ketone or an ester having a boiling point between 60°C and 150°C, by known techniques and using equipment designed to produce spherically shaped particles. The spraying is performed under temperature and pressure conditions such that the spherically shaped particles formed which have, in general, a granulometry comprised between 1 and 300 micron, are substantially free of solvent not chemically combined with the Mg dihalide. Subsequently, removal of the solvent combined with the carrier is completed by heating the particles under reduced pressure and at a temperature above 150°C and which, at the end of the treatment for complete removal of the solvent, is comprised between 200°C and 350°C.

The spherically shaped particles of the carrier thus obtained are then contacted with a halogenated Ti compound in order to fix the desired quantity of Ti thereon. This can be accomplished, for instance, by suspending the spherically shaped carrier particles in an inert solvent in which the Ti compound is dissolved in a quantity corresponding to the amount to be deposited on the particles, and then evaporating the solvent.

One preferred method for obtaining a supported catalyst-forming component (b) having the characteristics set forth in (b) (2) above, consists in reacting the spherically shaped particles of Mg dihalide containing more than four moles of water of crystallization with $SOCl_2$ until the particles are dehydrated to a $H_2O$ content comprised between 1.0 and 2.0 moles per mole of Mg dihalide, and then treating the carrier particles thus obtained with boiling $TiCl_4$ according to the method described above for the preparation of a supported catalyst-forming component (b) having the characteristics delineated in (b) (1).

Before the catalysts of this invention are used in the polymerization of alpha olefins, it can be useful to treat the support, before or after contact thereof with the Ti compound, with an electron donor. Also, for this case, the organometallic compound used as component (a) of the catalyst may be treated with an electron donor preferably used in a quantity of less than 1.0 mole thereof per mole of the organometallic compound, and preferably in a quantity of from 0.1 to 0.4 moles per mole of the organometallic compound.

Preferably, the electron donors are selected from esters of organic and inorganic oxygenated acids and from mono- and polyaminic compounds free of primary amino groups.

Significant examples of the useful electron donors include esters of benzoic acid and its alkyl derivatives, the N,N,N,N-tetraalkyl-ethylene-diamines piperazine, etc.

The Mg dihalides used as carrier for the halogenated Ti compounds may be mixed with 20 to 80% by weight of a co-carrier which is a compound of elements of Groups I to IV of the Mendeleyeev Periodic System different from the metal present in the organometallic compound used as catalyst-forming component (a). Examples of such useful co-carriers include $Na_2CO_3$; $Na_2SO_4$; and $B_2O_3$.

The Ti compounds which are useful in the preparation of the catalysts of this invention include, for example, the halides, halo-alcoholates, halo-amides, ammonium halo-titanates or halo-titanites, and Ti salts of organic halogenated acids. Presently preferred are liquid Ti compounds such as, for instance, $TiCl_4$; $TiCl_2(OC_4H_9)_2$; $TiBr_4$, etc.

Solid Ti compounds, such as $TiCl_3$, are used in the form of solutions of their complexes with electron donors in inert solvents. The quantity of the Ti compound used, expressed as Ti metal, is comprised, in general, between 0.1 and 20% by weight with respect to the supported catalyst-forming component.

The organometallic compounds of the Groups II and III metals which are used as catalyst-forming component (a) in the practice of this invention include aluminum trialkyls, dialkyl aluminum halides, and Zn and Mg alkyl compounds.

Examples of the useful catalyst-forming component (a) include $Al(C_2H_5)_3$; $Al(iC_4H_9)_3$; $Al(C_3H_7)_3$; $Al(C_2H_5)_2Cl$; $Zn(C_2H_5)_2$; and $Mg(C_2H_5)_2$.

When a catalyst of high stereospecificity for the polymerization of the higher alpha-olefins is desired the organometallic compounds of the Group II or III metals are used in part in the form of complexes thereof with electron donors.

The polymerization of ethylene and of the higher alpha-olefins, more particularly of propylene, butene-1, and 4-methylpentene-1, and of mixtures of ethylene and a higher alpha-olefin with the aid of the catalysts of this invention can be carried out under conventional conditions in the liquid phase and in the presence or absence of an inert liquid diluent, or in the gaseous phase.

In general, the polymerization temperature is comprised between 40°C and 200°C, preferably at a temperature of from 50°C to 100°C.

The molecular weight of the polymer produced can be regulated by including in the polymerization zone known regulators such as, for instance, hydrogen and Zn-dialkyls.

As disclosed herein, the polymers obtained with the aid of the present supported catalysts occur in the form of spherically or spheroidially shaped particles which are resistant to crumbling and caking as shown by tests to which the particles are subjected in bulk.

In order to determine the resistance to crumbling of the particulate polymers obtained by means of the present catalysts, 20 grams of polymer consisting of spherically shaped particles, and two small porcelain balls having a diameter of 25 mm, were placed in a metal cylinder having an inside diameter of 38 mm and length of 160 mn, fitted with a metal plug fixed horizontally on a sledge having a travel of 50 mm, and subjected to 240 oscillations per minute for 20 minutes.

The granulometry of the particles is then compared with that of the polymer as such, using screens of the ASTM series Nos. 4, 7, 10, 18, 35 and 70. The polymers obtained according to this invention have substantially the same granulotomery before and after the test.

In contrast, the size of the polymer particles is appreciably reduced when the polymers are obtained with the aid of catalysts different from those of this invention.

For testing the caking resistance of our polymer particles, four tablets of the polymer particles each of about 10 g, prepared by compression under a pressure of 394 kg/sq. cm. in a cyclindrical die (18 mm diameter) were subjected for six minutes to the same treatment used for determining resistance to crumbling.

If the tablets remain substantially compacted, the fine particles which separate are weighed, while if the tablets crumble completely the granulometry of the crumbled material is determined by means of the same screens used for the particles of the polymer as such.

The tablets of the particles obtained with the catalysts of this invention disintegrate almost completely under the treatment described, giving place to particles which are deformed but have, however, practically the same dimensions as the original small spheres.

On the contrary, the polymers obtained by means of catalysts different from those of this invention, do not disintegrate or disintegrate very little during the shaking test.

As already stated, the spherically shaped polymer particles obtained according to this invention resist both crumbling and compacting when tested as described herein.

Another feature of the catalysts of this invention is that the particles of the polymers obtained (having, in general a diameter of 1-2 mm) show a uniform distribution, within the mass, of the particles of Mg dihalide used as carrier. The residual Ti compound content of the polymer particles is, in general, less than 30 ppm of Ti.

The following examples are given to illustrate the invention and are not intended to be limiting. Unless otherwise stated, the percentages given are by weight.

EXAMPLE 1

Preparation of $MgCl_2.2H_2O$ in the spherical form

Molten $MgCl_2.6H_2O$ was sprayed in countercurrent with hot air into an apparatus of the "spray-cooling" type of the firm Niro Atomizer. The diameter of the spray nozzle was 0.34 mm. The over-pressure was obtained with nitrogen.

The spherically shaped particles were gathered on the bottom of the dryer and were then sieved in order to get a fraction of between 53 and 105 microns. The fraction thus separated was then dried in an oven at 130°C in a nitrogen current. After drying the product proved to consist of $MgCl_2.2H_2O$.

Preparation of the supported catalyst component

The equipment used consisted of a Pyrex glass reactor of about 3 liters holding capacity, having on its bottom a filtering plate of sinterized glass. The heating was obtained by means of an electric resistance wound around the lower tubular shaped part of the reactor. Moreover, the reactor was fitted with a reflux cooler, a stirrer, a thermometer and an anhydrous $N_2$ pressure reserve lung system. The feeding of carrier in the form of powder occurred through a gate, by means of a test tube that could be pressurized with $N_2$.

A glass flask connected with the bottom of the reactor gathers the reaction and washing liquids of the filtrate, while another flask, arranged laterally and connected with the head of the reactor, serves to heat and feed the washing liquids.

Contact between the Ti compound and support was accomplished by introducing 2500 cc of $TiCl_4$ into the reactor and then bringing the temperature of the $TiCl_4$ to its boiling point of 136.5°C. After a few minutes of boiling, 120 g of the carrier were introduced into the reactor under heavy stirring. The temperature thereupon dropped, due mainly to the effect of the HCl developed in the reaction and which dissolved in the $TiCl_4$ causing the lowering of its boiling point.

Gradually the temperature rose to 138°C, the boiling point of $TiCl_4$ containing a certain quantity of $TiOCl_2$ as reaction by-product. This temperature was maintained for 1 hour in order to complete the reaction.

Thereupon the reacted $TiCl_4$, containing the by-products, was filtered under heat. Two washings with $TiCl_4$ under heat, were then carried out, followed by 5 washes with heptane dehydrated by distillation on metal sodium.

The chemical analysis of the supported catalyst component, dried under vacuum, yielded the following results:

Ti = 2.95%; Cl = 69%; Mg = 20.5%; $H_2O$ = 2.85%
The X-ray analysis showed the presence of $MgCl_2$ and $MgCl_2.H_2O$. The surface area of the supported component amounted to 33.7 sq.mt/g.

The minimum specific supersonic energy necessary for achieving the complete rupture (crumbling) of the particles amounted to 10.3 Watt.hr/1. The mean radius of the pores was equal to 59 A.

Polymerization

Into an autoclave of 4.5 liters holding capacity, provided with a blade stirrer, a heating oil circuit and a cooling water circuit, there were introduced 2000 cc of purified heptane containing 4 g of Al-tri-isobutyl. The temperature was raised to about 75°C, then under $H_2$ pressure supplied by a lung system there was introduced the catalyst-component dispersed in heptane. The quantity introduced corresponded to 0.00452 g of Ti. Thereupon were introduced 7.5 kg/sq.cm of $H_2$ and 5.5 kg/sq. cm of ethylene, while the temperature was raised to 85°C.

The pressure was maintained constant by the continuous feeding of ethylene. The polymerization was conducted for a period of 4 hours. After degassing and cooling down, there were discharged 740 g of polyethylene. The polymer appeared in the form of spherically shaped particles of 1-2 mm diameter, which stood up to the standard crumbling and compacting tests previously described.

EXAMPLE 2

The carrier used was the same as that of Example 1. So, also were the method of preparing the catalytic component and the quantities of the reactants. Polymerization runs of propylene in liquid propylene, with and without complexing agents were carried out with this co-catalyst.

Polymerization without complexing agents:

Into the already described 4 liters autoclave, there were introduced under $H_2$ atmosphere, 3.1 g of Al-tri-isobutyl in about 10 cc of heptane. By means of a small 2 lt bottle, 1150 g of propylene were fed into the autoclave. The temperature was 30°C. Thereupon, there were introduced by injection with an $H_2$ overpressure, by means of a 50 cc bottle, 0.0141 g of co-catalyst corresponding to 0.00045 g of Ti and 0.9 g of Al-tri-isobutyl in 20 cc of heptane.

The temperature was then brought up to 60°C, and at this temperature the pressure proved to be equal to 27 atm. (the overpressure being due to the injected $H_2$). During 4 hours of polymerization the pressure dropped to 21 atm.

After cooling down and venting the propylene 750 g of polypropylene were discharged. The yield was 1,670,000 g of polypropylene/g of Ti. The residue of the heptane extraction amounted to 18.8%.

The polymer, after the extraction of the amorphous polypropylene, appeared in the form of spherical particles having a diameter of about 1 mm and resistant to both the compacting and crumbling tests.

Polymerization with triphenyl phosphine complexing agent:

The same autoclave and the same method described in the runs without complexing agents were used in this example.

In a $H_2$ current were fed in 4 g of Al-tri-isobutyl in about 15 cc of heptane; then there were introduced 1150 g of propylene. 0.009 g of catalyst were weighed out (corresponding to 0.00029 g of Ti) and were then fed into the small 50 cc bottle containing 0.02 g of triphenylphosphine in 20 cc of heptane; they were left in contact with each other for about 15 minutes. Thereupon the catalyst and the phosphine were injected into the autoclave with an $H_2$ pressure. The temperature was raised from 50° to 60°C and the pressure rose to 26 atm. After 4 hours the reaction mixture was cooled down, the propylene was vented and 143 g of polymer were discharged. The yield was 500,000 g of polypropylene/g of Ti. The residue of the heptane extraction was 29.5%. The polymer, after extraction of the amorphous substance, appeared in the form of spherical particles resistant to the standard crumbling and compacting tests.

Polymerization with ethyl benzoate complexing agent:

Into the already described autoclave there were introduced, under $H_2$-pressure, 3 g of Al-triethyl in 11 cc of heptane and 1.5 g of ethylbenzoate.

The autoclave was then fed with 950 g of propylene and the co-catalyst, 0.0171 g in 20 cc of heptane (corresponding to 0.00055 g of Ti) was injected by means of the $H_2$-pressurized bottle. The temperature was then brought up to 65°C and the pressure settled at 28 atm.

After 4 hours of polymerization, the polymerization mass was cooled down, the gases were vented and 43 g of polymer were discharged which appeared in the form of flowing little spheres that resist the crumbling and compacting tests, while the yield amounted to 78,000 g/g of Ti and the residue of the extraction with heptane was equal to 63.6%.

EXAMPLES 3 – 7

Examples 3 and 4 are comparative examples. The preparation of the hydrated Mg chloride of a spherical shape was carried out in a 6 liter jacketed autoclave fitted with a syphon drawing in the liquid phase, with a thermocouple for measuring the temperature, and with a monometer for the pressure.

On the drawing syphon is fitted an external sleeved pipe to the end of which is screwed on the spraying nozzle (0.64 mm of $\theta$). The heating is obtained by steam at 4.5 atm circulating in a heating jacket.

Into the autoclave were introduced 4 kg of $MgCl_2.6H_2O$. The temperature was raised to 128°C by circulating steam in the jacket. The pressure was brought up to 22 atm. by introducing nitrogen into the autoclave. After heating the external part of the syphon that leads to the spraying nozzle with steam, the valve was opened and the molten chloride was sprayed.

The sprayed chloride was gathered in a closed nitrogen lunged vessel containing anhydrous heptane. At the end of the spraying, the spherical powders were separated from the solvent and dried in an oven at temperatures <80° C, in a nitrogen current in order to eliminate the solvent.

The carrier consisted of spheres with a diameter smaller than 350 micron; about 30% was below 150 micron.

After sieving the carrier and after having chosen the fraction comprised between 105 and 149 microns, this latter was dried in an oven at various different temperatures.

The polymerizations of ethylene were accomplished with the same equipment and by the same method described in the preceding examples.

The data on the polymerization conditions, the results obtained and the characteristics of the polymers are recorded in Table 3.

TABLE I

| Example No. | 3 | 4 | 5 | 6 | 7 |
| --- | --- | --- | --- | --- | --- |
| Dehydration conditions: | 80°C 4 hrs | 95°C 4 hrs | 115°C 4 hrs | 135°C 4 hrs | 135°C 8 hrs |
| Cl — % | 36.45 | 40.95 | 46.35 | 53.75 | 60.95 |
| $H_2O$ — % | 51.40 | 43.05 | 37.20 | 26.80 | 16.00 |
| RX:Crystalline form | $MgCl_2.6H_2O$ | $MgCl_2.4H_2O$ | $MgCl_2.4H_2O$ $MgCl_2.2H_2O$ | $MgCl_2.2H_2O$ | $MgCl_2.H_2O$ |
| Theoretical % of Cl | 34.85 | 42.9 | 48.5 | 54.1 | 62.7 |
| Theoretical % of $H_2O$ | 53.2 | 42.4 | 34.9 | 27.4 | 15.9 |

TABLE 2

| Example No. | 3 | 4 | 5 | 6 | 7 |
| --- | --- | --- | --- | --- | --- |
| Quantity of carrier | 80 | 80 | 60 | 80 | 39 |
| Quantity of $TiCl_4$ (cc) | 2000 | 2000 | 2000 | 2000 | 2000 |
| Temperature °C | 137 | 137 | 137 | 138 | 137 |
| Duration (hrs) | 1 | 1 | 1 | 1 | 1 |
| Washing with $TiCl_4$ | 2 | 2 | 2 | 2 | 1 |
| Washing with $C_7^-$ | 5 | 5 | 5 | 5 | 5 |
| Analysis: in % | | | | | |
| Ti | 3.50 | 4.15 | 3.00 | 3.20 | 1.55 |
| Cl | 69.00 | 70.25 | 68.95 | 69.15 | 68.15 |
| Mg | 20.95 | 20.95 | 21.55 | — | 22.25 |
| Specific surface in Sq.mt/g | 98.2 | 109.9 | 64.9 | 21.3 | 11.4 |
| Resistance to supersonic vibration in Watt h/l | 3 – 3.17 | 2 – 3.2 | 10.3 | 25.6 | 25.6 |
| Mean radius of the pores (A) | 41 | 36 | 45 | 38 | 63 |

TABLE 3

| Example No. | 3 | 4 | 5 | 6 | 7 |
| --- | --- | --- | --- | --- | --- |
| Quantity of catalytic compound (g) | 0.0165 | 0.0153 | 0.0245 | 0.029 | 0.0343 |
| Quantity of Ti (g) | 0.00056 | 0.00064 | 0.00073 | 0.00093 | 0.00058 |
| Quantity of $Al(iC_4H_9)_3$(g) | 4 | 4 | 4 | 4 | 4 |
| Temperature °C | 85 | 85 | 85 | 85 | 85 |
| Duration, hours | 5 | 5 | 5 | 5 | 5 |
| Ethylene pressure (absolute atm.) | 8.5 | 8.5 | 8.5 | 8.5 | 8.5 |
| $H_2$ pressure (absolute atm.) | 5.5 | 5.5 | 5.5 | 5.5 | 5.5 |
| Quantity of polymer (g) | 508 | 840 | 310 | 195 | 234 |
| Yield, g pol./g of Ti | 900,000 | 1,300,000 | 425,000 | 210,000 | 400,000 |
| g pol./g of catalyst | 31,000 | 55,000 | 12,600 | 6,700 | 6,850 |
| Apparent density | 0.268 g/cc | 0.300 g/cc | 0.400 g/cc | 0.435 g/cc | 0.400 g/cc |
| Polymer Resistance to: | | | | | |
| crumbling | no | no | yes | yes | yes |
| compacting | no | no | yes | yes | yes |

The data concerning the dehydration of the spherical chloride, in order to obtain the various degrees of hydration, are reported in Table I.

The preparation of the supported catalytic components was carried out by utilizing the dehydrated carriers and by operating according to the method described in Example 1. The reaction conditions, the quantities of reactants and the analytical data of the supported components, are shown in Table 2.

EXAMPLES 8 – 10

Examples 8 and 9 are comparative examples. The catalytic components used in these examples have been obtained by using the fraction with a granulometry of 62 – 105 micron, obtained from the hexahydrate, tetrahydrate and di-hydrate of magnesium chloride respectively of Examples 3, 4 and 6.

The catalytic components have been prepared with the same method followed in Examples 3, 4 and 6.

Also the polymerization runs have been conducted under the same conditions as those of the above mentioned examples.

Table 4 shows the characteristics of the supported catalytic components, the results of the polymerization runs and the characteristics of the polymers obtained.

TABLE 4

| Example No. | 8 | 9 | 10 |
|---|---|---|---|
| Supported component analysis: | | | |
| Ti % | 3.69 | 3.25 | 2.55 |
| Cl % | 66.7 | 68.35 | 67.85 |
| Mg % | 18.9 | 19.85 | 21.40 |
| Specific surface in sq.mt/g | 156.1 | 82.9 | 12 |
| Resistance to crumbling, Watt.h/l | 3.8 – 6.4 | 6.4 | 25.6 |
| Mean radius, A | 38 | 34 | 40 |
| Polymerization: | | | |
| Yield in g.pol/g Ti | 760,000 | 1,066,000 | 435,000 |
| Polymer resistance to: | | | |
| crumbling | no | no | yes |
| compacting | no | no | yes |

EXAMPLE 11

Molten $MgCl_2 6H_2O$ was sprayed according to the method described in Example 1 The product thus obtained was screened in order to separate the fraction with granulometry comprised between 105 and 149 micron.

This fraction was then dried in an oven at 80°C for 4 hours in a nitrogen current. On X-ray examination the product was found to consist of $MgCl_2.6H_2O$.

80 g of this product were then made to react with 2000 cc of $TiCl_4$ in the apparatus described in Example 1.

After 1 hour, the excess $TiCl_4$ was removed while a further 2000 cc of fresh $TiCl_4$, heated to 120°C, were added and the temperature was maintained at 137°C for another hour. The $TiCl_4$ thereupon was discharged and the product was washed 3 times with hot $TiCl_4$ and 6 times with heptane.

The analysis of the dry product gave the following results:

Ti = 8.55 %; Cl = 61.45 %; Mg = 17.25 %.
The specific surface of the product was 27.4 sq.mt/g and the resistance to crumbling of the particles was equal to 12.8 Watt.h/l.

0.0151 g of this product were used in the polymerization of the ethylene under the conditions of Example 1.

Thereby were obtained 150 g of polymer substantially consisting of spherically shaped granules but in which were also present granules of an irregular geometrical shape. The polymer, subjected to standard crumbling and compacting tests, neither crumbled nor compacted.

EXAMPLE 12

60 g of $MgCl_2.6H_2O$ in the form of spherically shaped particles sized 53-105 micron, obtained by spraying with the apparatus described in Example 1, were made to react with 2500 cc of $SOCl_2$ placed into a 3 liter flask fitted with a stirrer and a reflux coolant. The reaction started at 55°C with development of gas. During the reaction the temperature slowly rose to 70°C.

The reaction was continued until a product had formed having the composition $MgCl_2.1.5H_2O$.

30 g of said product were then contacted with $TiCl_4$ under the same conditions as those of Example 1.

The analysis of the product, dried under vacuum at 70°C, gave the following results:

Ti = 2.80 %; Cl = 67.80 %. The specific surface was 77.2 sq.mt/g. The resistance to crumbling of the particles was 3.9 Watt.h/l. while the mean radius of the pores was 92 A.

0.0372 g of this product were used in the polymerization of ethylene under the same conditions as those of Example 1. Thereby were obtained 290 g of a polymer in the form of spheroidal particles which, subjected to the standard crumbling and compacting resistance tests, neither broke nor compacted.

EXAMPLE 13

50 g of the spherically shaped product of composition $MgCl_2 1.5H_2O$ obtained under the conditions of Example 12 were reacted with 50 cc of ethyl benzoate. After 16 hours the liquid was completely absorbed. The solid product was diluted with heptane and the suspension was brought to dryness under high vacuum at about 70°C.

The dried product was screened on a 200 micron sieve in order to remove the fraction of coarse particles.

30 g of the product thus obtained were contacted with 2000 cc of $TiCl_4$ under the conditions of Example 1. The product dried under vacuum gave the following analysis results:

Ti = 2.5%; Cl = 64 %; Mg = 21.2 %.

The specific surface was 118.9 sq.mt/g; the resistance to crumbling of the particles was 1.7 Watt.h/l. The mean radius of the pores was 92 A.

0.041 g of the product was used in the polymerization of ethylene under the conditions of Example 1. The polymer thus obtained appeared in the form of spherical granules of 1-2 mm diameter, which, subjected to the standard tests for the determination of the resistance to crumbling and compacting, neither crumbled nor compacted.

EXAMPLE 14

$MgCl_2.0.45H_2O$ in the form of spheroidal particles was prepared by dehydration in a current of gaseous HCl at 110°C of $MgCl_2.6H_2O$ particles sized 53-105 micron obtained by the spraying method described in Example 1.

45 g of said product were then contacted with $TiCl_4$ under the same conditions as those of Example 1.

The supported catalytic component thus obtained, after drying, gave the following analytical results:

Ti = 0.3 %; Cl = 69.80 %; Mg = 25.60 %.
The specific surface was 3.7 sq.mt/g; the resistance to crumbling was 6.4 Watt.h/l.

0.1902 g of this product were used in the polymerization of ethylene under the same conditions as those of Example 1.

Thereby were obtained 70 grams of polymer in the form of spheroidal particles having a diameter of 1-2 mm and which, when subjected to the standard tests for determining the resistance to crumbling and compacting, neither crumbled nor compacted.

We claim:
1. Catalysts for the polymerization of olefins obtained by mixing:

a. a catalyst-forming component which is an organometallic compound of metals of Group II and III of the Mendelyeev Periodic System, with b. a supported catalyst-forming component which is the product consisting of a carrier comprising an anhydrous Mg dihalide and of a halogenated Ti-compound chemically fixed on the carrier or dispersed on the same, said product being in the form of spherically shaped particles of a diameter comprised between 1 and 350 micron, which are characterized by values of the resistance to crumbling under the action of supersonic vibrations expressed in Watt.h/l, of the mean radius of the pores and of the surface area, which satisfy one of the following relationships:

1. resistance to supersonic vibrations comprised between 5 and 40 Watt.h/l, mean radius comprised between 30 and 70 A and surface area comprised between 3 and 70 sq.mt/g;
2. resistance to supersonic vibrations of 1–20 Watt.h/l, mean radius of the pores comprised between 70 and 150 A and surface area greater than 70 sq.mt/g.

2. Catalysts according to claim 1, characterized in that component (b) shows a resistance to supersonic vibrations comprised between 10 and 30 Watt.h/l, a mean radius of the pores between 35 and 60 A and surface area comprised between 3 and 70 sq.mt/g.

3. Catalysts according to claim 1, characterized in that component (b) shows a resistance to supersonic vibrations between 1 and 10 Watt.h/l, a mean radius of the pores between 70 and 100 A and a surface area greater than 70 sq.mt/g.

4. Catalyst according to claim 1, in which the carrier comprises, in addition to the Mg dihalide, a co-carrier that is different from and inert to the Mg dihalide and selected from compounds of the elements of Groups I to IV of the Mendelyeev Periodic System.

5. Catalysts according to claim 1, in which the carrier is modified by reaction with an electron-donor compound.

6. Catalysts according to claim 1, in which the carrier comprises Mg chloride and the Ti compound chemically fixed on the carrier or dispersed on the same is a Ti halide.

7. Catalysts according to claim 1, in which the carrier comprises Mg chloride and the Ti compound chemically fixed thereon or dispersed on the same is $TiCl_4$.

8. Catalysts according to claim 1, in which the Ti compound present on the carrier is in a quantity comprised between 0.1 and 20% by weight, expressed as Ti metal.

9. Catalysts according to claim 1, in which catalyst-forming component (a) is an Al-trialkyl partially complexed with an electron-donor compound.

10. Process for the preparation of the catalysts according to claim 1, in which the supported component (b) shows a resistance to supersonic vibrations comprised between 5 and 40 Watt.h/l, a mean radius of the pores between 30 and 70 A and a surface area comprised between 3 and 70 sq.mt/g, consisting in subjecting to spraying a hydrated Mg dihalide to obtain spherically shaped particles, dehydrating the particles of the dihalide to values of the crystallization water of between 0.5 and 3.5 moles, reacting the partially dehydrated particles in a liquid medium comprising a Ti compound at temperatures exceeding 100°C, and finally removing any Ti compound which is not fixed on the carrier.

11. Process according to claim 10, in which the hydrated Mg dihalide particles containing from 0.5 to 3.5 moles of crystallization $H_2O$, are contacted with boiling $TiCl_4$.

12. Process for the polymerization of ethylene and of alphaolefins with 3 – 6 carbon atoms, or mixtures thereof with minor quantities of ethylene, characterized in that the polymerization is carried out in the presence of a catalyst according to claim 1.

13. Polyolefins in the form of spherically shaped non-extruded particles having a diameter comprised between 0.5 and 3 mm. containing a Ti compound in a quantity, expressed as metal Ti, of less than 30 ppm, and further characterized in that said particles do not crumble when subjected to 240 oscillations per minute for 20 minutes in a metal cylinder containing porcelain balls having a diameter of 25 mm and fitted with a metal plug fixed horizontally on a sledge having a travel of 50 mm and do not compact when subjected to the same conditions after compression thereof under a pressure of 394 kg 1 sq. cm.

* * * * *

UNITED STATES PATENT OFFICE
CERTIFICATE OF CORRECTION

Patent No. 3,953,414          Dated April 27, 1976

Inventor(s) Paolo Galli et al.

It is certified that error appears in the above-identified patent and that said Letters Patent are hereby corrected as shown below:

<u>Covering page,</u>  the list of references cited should include the following additional references:

927,969   —   6/63   —   United Kingdom
    841,822   —   7/70   —   United Kingdom
    851,111   —   10/60   —   United Kingdom
  1,024,336   —   3/66   —   United Kingdom.

Signed and Sealed this

Eighteenth Day of July 1978

[SEAL]

Attest:

RUTH C. MASON
*Attesting Officer*

DONALD W. BANNER
*Commissioner of Patents and Trademarks*

UNITED STATES PATENT OFFICE
CERTIFICATE OF CORRECTION

Patent No. 3,953,414    Dated April 27, 1976

Inventor(s) Paolo Galli et al.

It is certified that error appears in the above-identified patent and that said Letters Patent are hereby corrected as shown below:

On the cover sheet, Item [63] and in column 1, line 5, "Sept. 12, 1974" should read -- Sept. 12, 1973 --.

Signed and Sealed this

Nineteenth Day of December 1978

[SEAL]

Attest:

RUTH C. MASON
Attesting Officer

DONALD W. BANNER
Commissioner of Patents and Trademarks